United States Patent
Wang

(10) Patent No.: US 12,366,635 B1
(45) Date of Patent: Jul. 22, 2025

(54) DEVICE FOR WIRELESS HUMAN DETECTION BASED ON MICROWAVES, INFLATABLE MODEL, AND METHOD FOR HUMAN DETECTION

(71) Applicant: Fanglan Wang, Anhui (CN)

(72) Inventor: Fanglan Wang, Anhui (CN)

( * ) Notice: Subject to any disclaimer, the term of this patent is extended or adjusted under 35 U.S.C. 154(b) by 0 days.

(21) Appl. No.: 18/886,272

(22) Filed: Sep. 16, 2024

(51) Int. Cl.
| | | |
|---|---|---|
| *G01S 7/41* | (2006.01) | |
| *G01S 13/04* | (2006.01) | |
| *G01S 13/58* | (2006.01) | |
| *G06F 3/16* | (2006.01) | |
| *H05B 47/115* | (2020.01) | |

(52) U.S. Cl.
CPC ............... *G01S 7/41* (2013.01); *G01S 13/04* (2013.01); *G01S 13/581* (2013.01); *G06F 3/162* (2013.01); *H05B 47/115* (2020.01)

(58) Field of Classification Search
CPC ........ G01S 17/42; G01S 7/4817; G01S 17/89; G01S 7/4808; G01S 13/931; G01S 17/04; G01S 17/08; G01S 7/4813; G01S 13/04; G01S 13/50; G01S 13/881; G01S 13/887; G01S 13/886; G01S 13/88; G01S 7/35; G01S 7/023; G01S 7/032; G01S 7/414; G01S 13/343; G01S 7/352; G01S 7/354
See application file for complete search history.

(56) References Cited

U.S. PATENT DOCUMENTS

| | | | | |
|---|---|---|---|---|
| 11,368,573 | B1* | 6/2022 | Teng | G06F 3/017 |
| 2012/0032838 | A1* | 2/2012 | Heilmann | G01S 13/95 |
| | | | | 342/192 |
| 2019/0089550 | A1* | 3/2019 | Rexach | A47K 5/1217 |
| 2023/0014948 | A1* | 1/2023 | Guan | G06V 10/751 |

FOREIGN PATENT DOCUMENTS

WO   WO-2020043195 A1 *  3/2020   ............... G01V 3/12

* cited by examiner

*Primary Examiner* — Olumide Ajibade Akonai
(74) *Attorney, Agent, or Firm* — Hawaii Patent Services; Nathaniel K. Fedde; Kenton N. Fedde

(57) ABSTRACT

Disclosed is a device for wireless human detection based on microwaves, the device includes a microprogrammed control unit (MCU) module and a microwave module, where the microwave module is electrically connected to the MCU module, the microwave module is provided with a microwave antenna, the microwave antenna emits microwaves to generate a space microwave alert area with a preset dimension in an axial direction of the microwave antenna, and the microwaves interfere with reflected echoes, such that power of the microwave antenna is changed; the microwave module converts a power change into an electrical signal and transmits the electrical signal to the MCU module; and the MCU module receives the electrical signal and identifies a target detection object.

20 Claims, 2 Drawing Sheets

DEVICE FOR WIRELESS HUMAN DETECTION BASED ON MICROWAVES, INFLATABLE MODEL, AND METHOD FOR HUMAN DETECTION

TECHNICAL FIELD

The present disclosure relates to the field of sensors, and particularly relates to a device for wireless human detection based on microwaves, an inflatable model, and a method for human detection.

BACKGROUND

In daily life, there is often such a phenomenon: when a person walks around, a sensor recognizes a signal to light up a lamp, but after the person stays still for a period of time, the sensor will turn off the lamp because it recognizes no signal. In order to keep the lamp on, the person frequently needs to walk around slightly at least every so often. Such situations are common, and although they do not have a serious impact on daily life, they are still not convenient enough.

In order to solve the above problems, some sensors are chosen to be invented that are able to detect users standing still, such as infrared sensors, ultrasonic sensors, and so on. However, there are still major limitations to the use of these sensors. For example, U.S. Invention Patent US20160153837A1 provides INFRARED SENSOR including a first infrared ray absorbing portion and a plurality of protrusions, and capable of achieving a high accuracy of human contour detection. However, the invention becomes insensitive when operating in conditions where the ambient temperature is close to the body temperature, resulting in misjudgment of an apparatus.

In summary, a novel sensor with high anti-interference capability, excellent applicability, and an ability to detect stationary users is urgently needed.

SUMMARY

In order to solve the problems that existing sensors can hardly detect static targets and are susceptible to interference, the present disclosure provides a device for wireless human detection based on microwaves. The device includes a microprogrammed control unit (MCU) module and a microwave module, where the microwave module is electrically connected to the MCU module, the microwave module is provided with a microwave antenna, the microwave antenna emits microwaves and generates a space microwave alert area having a preset dimension in an axial direction of the microwave antenna, and the microwaves in the space microwave alert area interfere with echoes formed after the microwaves are reflected by a surface of an object, such that power of the microwave antenna is changed; the microwave module monitors a change, converts the change into an electrical signal, and transmits the electrical signal to the MCU module; and the MCU module receives the electrical signal and identifies a target detection object.

The above solution provides the device for wireless human detection based on microwaves. When an object to be detected exists in the space microwave alert area, the microwaves in the area interfere with the echoes formed by reflection by the surface of the object. After the microwave module detects the interference, it may be determined that the object to be detected exists in the area, such that a person in a static state can be detected. Moreover, for different detection objects, the interference generated by the echoes is different, the microwave module transmits different electrical signals to the MCU module according to the interference, and the MCU module may determine whether there is a target object to be detected in the area according to the electrical signal, such that interference of other objects in a scene can be effectively reduced, so as to reduce a false detection rate and improve accuracy.

The present disclosure further provides an inflatable model. The inflatable model includes an inflatable model body, where the inflatable model is internally provided with a device for wireless human detection based on microwaves, the device for wireless human detection based on microwaves includes an MCU module and a microwave module, the microwave module is electrically connected to the MCU module, the microwave module is provided with a microwave antenna, the microwave antenna emits microwaves and generates a space microwave alert area having a preset dimension in an axial direction of the microwave antenna, and the microwaves in the space microwave alert area interfere with echoes formed after the microwaves are reflected by a surface of an object, such that power of the microwave antenna is changed; the microwave module monitors a change, converts the change into an electrical signal, and transmits the electrical signal to the MCU module; the MCU module receives the electrical signal and identifies a target detection object; and the device for wireless human detection based on microwaves further includes an action assembly, the action assembly is electrically connected to the MCU module, and the MCU module controls the action assembly to work after identifying the target detection object.

Through the present disclosure of the solution, the problem that an existing inflatable model can hardly detect a static user is solved; and further, compared with an inflatable model using a traditional sensor, the solution also solves the problem that the inflatable model is prone to be triggered by mistake.

Finally, the present disclosure further provides a method for human detection based on microwaves. The method includes: electrically connecting an MCU module to a microwave module, and providing the microwave module with a microwave antenna, where the microwave antenna emits microwaves and generates a space microwave alert area having a preset dimension in an axial direction of the microwave antenna, and the microwaves in the space microwave alert area interfere with echoes formed after the microwaves are reflected by a surface of an object, such that power of the microwave antenna is changed; monitoring, by the microwave module, a change, converting the change into an electrical signal, and transmitting the electrical signal to the MCU module; and receiving, by the MCU module, the electrical signal, and identifying a target detection object.

Through the present disclosure of the solution, a method for detecting a static human body is provided. The object to be detected is determined to exist in an area through interference between the microwaves and the echoes reflected by the surface of the object, and the method has the advantages of strong applicability and anti-interference.

BRIEF DESCRIPTION OF THE DRAWINGS

In order to describe the technical solutions in the present application more clearly, the accompanying drawings required for describing the embodiments are briefly described below. Obviously, the accompanying drawings in the following description show merely some embodiments of the present application, and those of ordinary skill in the art can also derive other accompanying drawings from these accompanying drawings without making creative efforts.

In the figures: 1. power socket; 2. power adapter; 3. microwave antenna; 4. microwave module; 5. MCU module; 6. audio storage module; 7. power amplifier; 8. speaker; 9. LED lamp panel; and 10. motor.

DETAILED DESCRIPTIONS OF THE EMBODIMENTS

The technical solutions in examples of the present application are clearly and completely described below with reference to the accompanying drawings in the examples of the present application. Apparently, the examples described are merely some examples rather than all examples of the present application. Based on the examples of the present application, all other examples derived by those of ordinary skill in the art without creative efforts fall within the scope of protection of the present application.

Reference herein to "example" or "embodiment" means that a particular feature, structure, or characteristic described in connection with the example or embodiment may be included in at least one example of the present application. The appearances of the phrases in various places in the specification are not necessarily all referring to the same example, nor are separate or alternative examples mutually exclusive of other examples. Those skilled in the art will understand explicitly and implicitly that the examples described herein may be combined with other examples.

In the specification, for convenience, expressions indicating the orientation or position relations of "center", "up", "down", "front", "back", "vertical", "horizontal", "top", "bottom", "inside", "outside", etc. are used to describe position relations of constituent elements with reference to the accompanying drawings, are merely for facilitating the description of the specification and simplifying the description, rather than indicating or implying that the device or element referred to must have a particular orientation or be constructed and operated in a particular orientation, and therefore cannot be interpreted as limiting the present disclosure. The position relations of constituent elements are appropriately changed according to orientations of the described constituent elements. Therefore, it is not limited to the expressions described in the specification, and may be replaced appropriately according to circumstances.

The present disclosure will be further described in detail below with reference to the accompanying drawings and particular embodiments.

Figure 1:
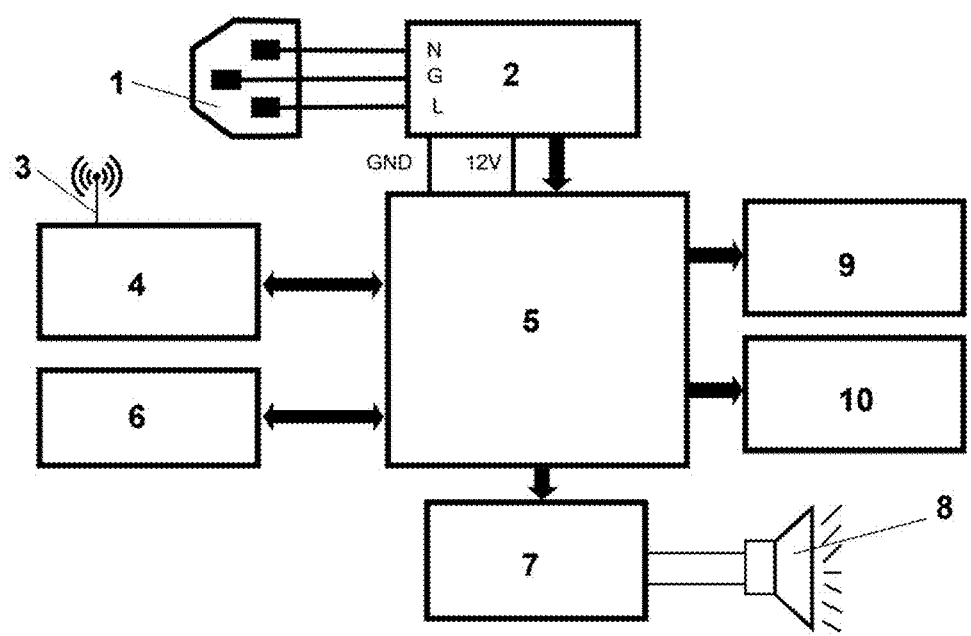
FIG. 1 is a schematic block diagram of the present disclosure.
Figure 2:
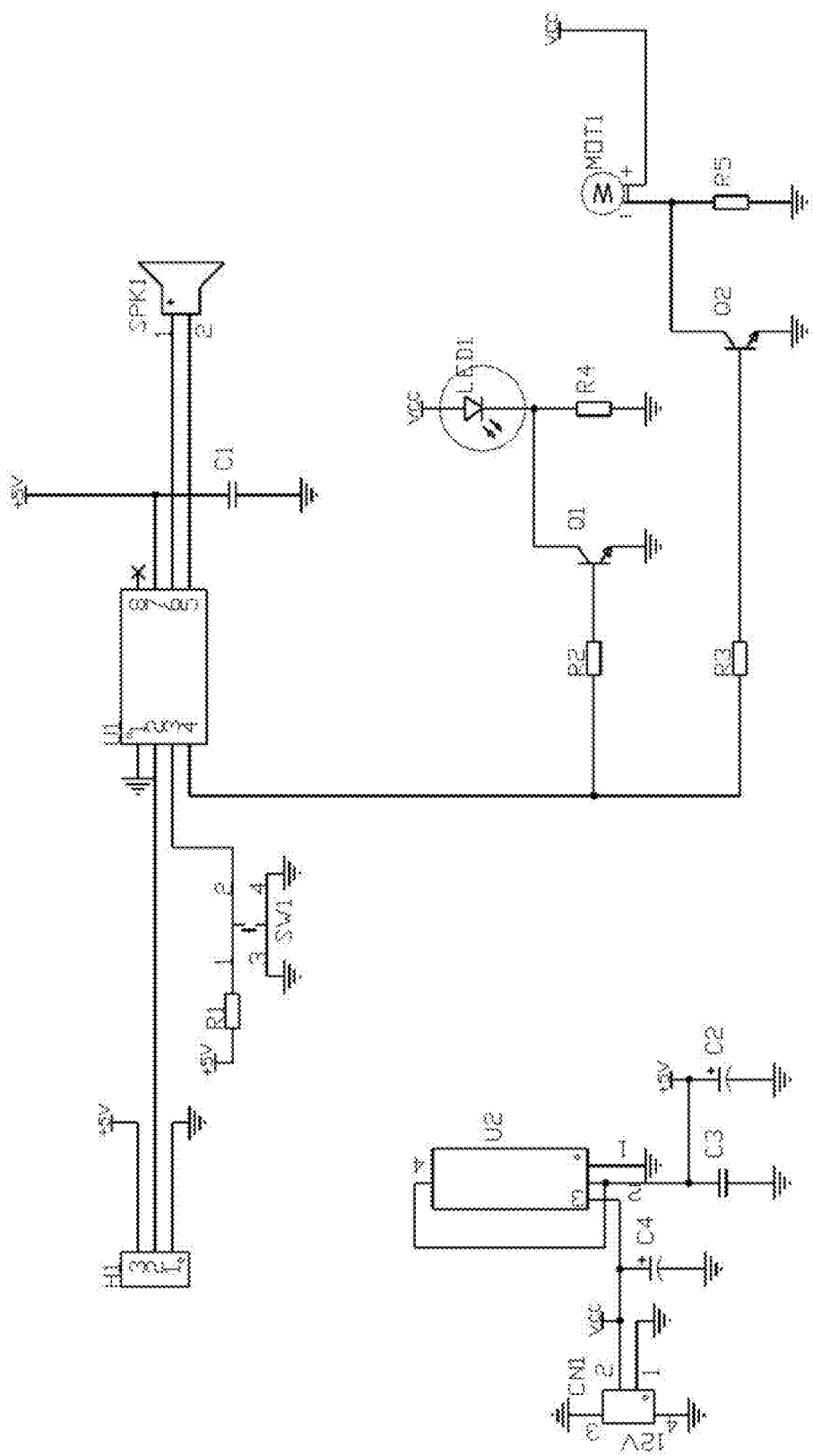
FIG. 2 is a schematic circuit diagram of the present disclosure.

In a first aspect, the present disclosure provides a device for wireless human detection based on microwaves. As shown in FIG. 1, the device includes a microprogrammed control unit (MCU) module 5 and a microwave module 4 electrically connected to the MCU module. A microwave antenna 3 capable of emitting microwaves to the outside is further arranged on the microwave module 4. The microwave module 4 may monitor the microwaves emitted from the microwave antenna 3.

When the device works, the microwave antenna 3 emits the microwaves to the outside and forms a space microwave alert area in a space having a preset size. The preset space may be an elliptical area with the microwave antenna 3 as an axis, and a radius of the preset space is 0 meter-10 meters.

A user can adjust the preset space according to actual needs. Moreover, the microwave module 4 monitors microwaves in the area.

When propagating in the area, the microwaves are reflected by a surface of an object to generate echoes, which will interfere with the microwaves in the area. When the microwaves in the area interfere, power of the microwave antenna 3 changes. The microwave module 4 detects a power change of the microwave antenna 3, converts the power change into an electrical signal and transmits the power change to the MCU module 5. Finally, the MCU module 5 receives the electrical signal from the microwave module 4, and determines whether the device detects a target detection object based on the electrical signal.

In some examples, a target pulse width may be preset in the MCU module 5 before or when the device works. When the MCU module 5 receives the electrical signal from the microwave module 4, it is determined whether the electrical signal comes from the target detection object according to the target pulse width.

For example, in some scenarios, when small animals pass by, or when trees shake at a distance, microwaves in the area produce small interference, causing small amplitude variations in the power emitted from the microwave antenna 3. The microwave module 4 generates one pulse signal with a smaller width according to the power change and transmits the pulse signal to the MCU module 5. The MCU module 5 detects the electrical signal, determines that a width of a pulse this time is less than the target pulse width, and chooses to omit the electrical signal.

In some other scenarios, the microwaves are reflected by a human body and strongly interfere in the area, causing large amplitude variations in the power of the microwave antenna 3. The microwave module 4 generates one pulse signal with a larger width according to the power change and transmits the pulse signal to the MCU module 5. After detecting the electrical signal, the MCU module 5 determines that a width of a pulse this time is not less than the target pulse width, that is, the device detects the target detection object at this time.

In some examples, the device further includes an audio storage module 6 electrically connected to the MCU module 5. When determining that the device detects the target detection object, the MCU module 5 reads an audio file from the audio storage module 6.

In some examples, the device further includes a speaker 8 electrically connected to the MCU module 5. When the MCU module 5 reads the audio file from the audio storage module 6, the audio file is played through the speaker 8. In some examples, the device further includes a power amplifier 7. The power amplifier 7 is coupled between the MCU module 5 and the speaker 8.

In some examples, the MCU module 5 is further electrically connected to a light-emitting diode (LED) lamp panel 9. When detecting the target detection object, the MCU module 5 controls the LED lamp panel 9 to work.

In some examples, the MCU module 5 is further electrically connected to a motor 10. When detecting the target detection object, the MCU module 5 controls the motor 10 to work.

In some examples, the MCU module 5 is powered by a power adapter 2. Output of power adapter 2 is 12V/3 A, 36 W.

In some examples, the microwave module 4 may identify a motion state of the detection object according to a Doppler effect of electromagnetic waves. For example, for a static object, the microwave module 4 transmits an electrical signal to the MCU module 5 at a normal frequency. For an object approaching or moving away gradually, a frequency of an electrical signal transmitted form the microwave module 4 should be higher or lower than the normal frequency. The audio storage module 6 stores audio files suitable for different scenarios. The MCU module 5 selects appropriate audio files to play according to a detected frequency of an electrical signal. Moreover, the MCU module 5 controls working modes of an LED lamp panel 9 and a motor 10 according to the detected frequency of the electrical signal.

In a second aspect, the present disclosure further provides an inflatable model. The inflatable model includes an inflatable model body. The device for wireless human detection based on microwaves is arranged in the inflatable model body. The inflatable model body is a bag body. At least the device for wireless human detection based on microwaves may be accommodated in the inflatable model body. The inflatable model body may be made of one of polyvinyl chloride (PVC), polyethylene (PE) and waterproof cloth. Furthermore, the inflatable model body may be inflated to maintain a fixed shape in a certain time.

The device for wireless human detection based on microwaves arranged in the inflatable model body includes an MCU module 5 and a microwave module 4 electrically connected to the MCU module. A microwave antenna 3 capable of emitting microwaves to the outside is arranged on the microwave module 4. The microwave module 4 may monitor the microwaves emitted from the microwave antenna 3.

When the inflatable model works, the microwave antenna 3 emits the microwaves to the outside and forms a space microwave alert area in a space having a preset size. The preset space may be an elliptical area with the microwave antenna 3 as an axis, and a radius of the preset space is 0 meter-10 meters. A user can adjust the preset space according to actual needs. Moreover, the microwave module 4 monitors microwaves in the area.

When propagating in the area, the microwaves are reflected by a surface of an object to generate echoes, which will interfere with the microwaves in the area. When the microwaves in the area interfere, power of the microwave antenna 3 changes. The microwave module 4 detects a power change of the microwave antenna 3, converts the power change into an electrical signal and transmits the power change to the MCU module 5. Finally, the MCU module 5 receives the electrical signal from the microwave module 4, and determines whether the device detects a target detection object based on the electrical signal. The device for wireless human detection further includes an action assembly electrically connected to the MCU module 5. The MCU module 5 controls the action assembly to work after identifying the target detection object.

In some examples, a target pulse width may be preset in the MCU module 5 before or when the inflatable model works. When the MCU module 5 receives the electrical signal from the microwave module 4, it is determined whether the electrical signal comes from the target detection object according to the target pulse width.

For example, in some scenarios, when small animals pass by, or when trees shake at a distance, microwaves in the area produce small interference, causing small amplitude variations in the power emitted from the microwave antenna 3. The microwave module 4 generates one pulse signal with a smaller width according to the power change and transmits the pulse signal to the MCU module 5. The MCU module 5 detects the electrical signal, determines that a width of a pulse this time is less than the target pulse width, and chooses to omit the electrical signal.

In some other scenarios, the microwaves are reflected by a human body and strongly interfere in the area, causing large amplitude variations in the power of the microwave antenna 3. The microwave module 4 generates one pulse signal with a larger width according to the power change and transmits the pulse signal to the MCU module 5. After detecting the electrical signal, the MCU module 5 determines that a width of a pulse this time is not less than the target pulse width, that is, the device detects the target detection object at this time, so as to control the action assembly to work.

In some examples, the device for wireless human detection based on microwaves in the inflatable model further includes an audio storage module 6 electrically connected to the MCU module 5. When determining that the device detects the target detection object, the MCU module 5 reads an audio file from the audio storage module 6.

In some examples, the device for wireless human detection based on microwaves in the inflatable model further includes a speaker 8 electrically connected to the MCU module 5. When the MCU module 5 reads the audio file from the audio storage module 6, the audio file is played through the speaker 8. In some examples, the device further includes a power amplifier 7. The power amplifier 7 is coupled between the MCU module 5 and the speaker 8.

In some examples, the MCU module 5 is further electrically connected to an LED lamp panel 9. When detecting the target detection object, the MCU module 5 supplies power to the LED lamp panel 9 to illuminate an interior or an exterior surface of the inflatable model body.

In some examples, the MCU module 5 is further electrically connected to a motor 10. When detecting the target detection object, the MCU module 5 controls the motor 10 to work, such that the motor blows the inflatable model body or inflates the inflatable model body.

In some examples, the MCU module 5 is powered by a power adapter 2. Output of power adapter 2 is 12V/3 A, 36 W.

In some examples, the microwave module 4 may identify a motion state of the detection object according to a Doppler effect of electromagnetic waves. For example, for a static object, the microwave module 4 transmits an electrical signal to the MCU module 5 at a normal frequency. For an object approaching or moving away gradually, a frequency of an electrical signal transmitted form the microwave module 4 should be higher or lower than the normal frequency. The audio storage module 6 stores audio files suitable for different scenarios. The MCU module 5 selects appropriate audio files to play according to a detected frequency of an electrical signal. Moreover, the MCU module 5 controls working modes of an LED lamp panel 9 and a motor 10 according to the detected frequency of the electrical signal.

In one use scenario of the inflatable model, a target pulse width is set for the MCU module 5 of the device for wireless human detection based on microwaves in the inflatable model according to microwave interference generated by a human body. When there is any person in the area, the microwaves generate interference, such that the power of the microwave antenna 3 changes, and the microwave module 4 detects the change and transmits a corresponding electrical signal to the MCU module 5. The MCU module 5 compares the electrical signal with the target pulse width and determines that the presence of a person in the area has been detected at this time.

Further, under the condition that the person walks towards the inflatable model at this time, the microwave module 4 also detects that the frequency of the echoes gradually increases. In this case, the MCU module 5 may read the audio file from an audio storage module and play a welcome audio. Moreover, the MCU module 5 may also control an LED lamp on the LED lamp panel 9 to blink, and control the motor 10 to blow the inflatable model body or inflate the inflatable model body.

Finally, the present disclosure also provides a method for human detection based on microwaves:

The MCU module 5 is electrically connected to the microwave module 4. A microwave antenna 3 capable of emitting microwaves to the outside is arranged on the microwave module 4. The microwave module 4 monitors the microwaves emitted from the microwave antenna 3. The microwave antenna 3 emits the microwaves to the outside and forms a space microwave alert area having a preset size. When propagating in the area, the microwaves are reflected by a surface of an object to generate echoes, which will interfere with the microwaves in the area. When the microwaves in the area interfere, the power of the microwave antenna 3 changes. The microwave module 4 detects a power change of the microwave antenna 3, converts the power change into an electrical signal, and transmits the power change to the MCU module 5, and the MCU module 5 determines whether the interference comes from the target detection object according to the electrical signal.

In some examples, a target pulse width may be preset in the MCU module 5 in advance. When the MCU module 5 receives the electrical signal from the microwave module 4, it is determined whether the electrical signal comes from the target detection object according to the target pulse width.

For example, in some scenarios, when small animals pass by, or when trees shake at a distance, microwaves in the area produce small interference, causing small amplitude variations in the power emitted from the microwave antenna 3. The microwave module 4 generates one pulse signal with a smaller width according to the power change and transmits the pulse signal to the MCU module 5. The MCU module 5 detects the electrical signal, determines that a width of a pulse this time is less than the target pulse width, and chooses to omit the electrical signal.

In some other scenarios, the microwaves are reflected by a human body and strongly interfere in the area, causing large amplitude variations in the power of the microwave antenna 3. The microwave module 4 generates one pulse signal with a larger width according to the power change and transmits the pulse signal to the MCU module 5. After detecting the electrical signal, the MCU module 5 determines that a width of a pulse this time is not less than the target pulse width, that is, the target detection object is detected at this time.

In some examples, the MCU module 5 is electrically connected to an action assembly. When detecting the target detection object, the MCU module controls the action assembly to work.

In some examples, the action assembly is an LED lamp panel 9. When identifying the target detection object, the MCU module 5 controls the LED lamp panel 9 to work. In some examples, the action assembly is a motor 10. When identifying the target detection object, the MCU module 5 controls the motor 10 to work.

In some examples, the action assembly includes an audio storage module 6 storing audio files, and a speaker 8. When identifying the target detection object, the MCU module 5 reads the audio files from the audio storage module 6 and plays the audio files through the speaker 8. In some examples, the MCU module 5 and the speaker 8 are connected through a power amplifier 7.

The technical means disclosed in the solutions of the present disclosure are not limited to the technical means disclosed in the above embodiments, but also include technical solutions consisting of any combination of the above technical features. It should be noted that those of ordinary skill in the art can make several improvements and modifications without departing from the principles of the present disclosure, and these improvements and modifications also fall within the scope of protection of the present disclosure.

What is claimed is:

1. A device for wireless human detection based on microwaves, comprising a microprogrammed control unit (MCU) module and a microwave module, wherein the microwave module is electrically connected to the MCU module, and the microwave module is provided with a microwave antenna, the microwave antenna is configured to emit microwaves and generate a space microwave alert area having a preset dimension in an axial direction of the microwave antenna;

the microwave module is configured to monitor a power change in the microwave antenna caused by interference between the emitted microwaves and echoes formed after previously-emitted microwaves are reflected by a surface of an object in the space microwave alert area, convert the power change into an electrical signal, and transmits the electrical signal to the MCU module; and the MCU module receives the electrical signal and identifies a target detection object.

2. The device for wireless human detection based on microwaves according to claim 1, wherein a target pulse width is recorded in the MCU module before or when the microwave antenna emits the microwaves; and the MCU module is configured to identify the target detection object as follows: the MCU module filters out the electrical signal less than the target pulse width and identifies the electrical signal greater than the target pulse width.

3. The device for wireless human detection based on microwaves according to claim 2, further comprising an audio storage module electrically connected to the MCU module, wherein the audio storage module is configured to store an audio file, and the MCU module is configured to, when identifying the target detection object, read the audio file from the audio storage module.

4. The device for wireless human detection based on microwaves according to claim 3, further comprising a speaker electrically connected to the MCU module for playing the audio file read from an audio storage module by the MCU module.

5. The device for wireless human detection based on microwaves according to claim 4, wherein the MCU module is electrically connected to the speaker through a power amplifier.

6. The device for wireless human detection based on microwaves according to claim 1, further comprising a light-emitting diode (LED) lamp panel electrically connected to the MCU module, wherein the MCU module is configured to, when identifying the target detection object, control the LED lamp panel to work.

7. The device for wireless human detection based on microwaves according to claim 1, further comprising a motor electrically connected to the MCU module, wherein when identifying the target detection object, the MCU module controls the motor to work.

8. The device for wireless human detection based on microwaves according to claim 1, wherein the MCU module is powered by a power adapter electrically connected to the MCU module, and output of the power adapter is 12V/3 A, 36 W; and the space having a preset dimension is an ellipsoidal area with the microwave antenna as an axis and a radius of less than 10 meters.

9. The device for wireless human detection based on microwaves according to claim 1, wherein a frequency of the echoes changes according to a motion state of a detection object, and the microwave module converts the electrical signal according to the frequency of the echoes, such that the MCU module identifies the motion state of the detection object.

10. An inflatable model, comprising an inflatable model body, wherein the inflatable model is internally provided with a device for wireless human detection based on microwaves, the device for wireless human detection based on microwaves comprises an MCU module and a microwave module, the microwave module is electrically connected to the MCU module, the microwave module is provided with a microwave antenna, the microwave antenna is configured to emit microwaves and generate a space microwave alert area having a preset dimension in an axial direction of the microwave antenna;

the microwave module is configured to monitor a power change in the microwave antenna caused by interference between the emitted microwaves and echoes formed after previously-emitted microwaves are reflected by a surface of an object in the space microwave alert area, convert the power change into an electrical signal, and transmit the electrical signal to the MCU module;

the MCU module is configured to receive the electrical signal and identify a target detection object; and the device for wireless human detection based on microwaves further comprises an action assembly, the action assembly is electrically connected to the MCU module, and the MCU module is configured to control the action assembly to work after identifying the target detection object.

11. The inflatable model according to claim 10, wherein a target pulse width is recorded in the MCU module before or when the microwave antenna emits the microwaves; and the MCU module is configured to identify the target detection object as follows: the MCU module filters out the electrical signal less than the target pulse width and identifies the electrical signal greater than the target pulse width.

12. The inflatable model according to claim 10, wherein the action assembly comprises an audio storage module electrically connected to the MCU module, and the audio storage module is configured to store an audio file, and the MCU module is configured to, when identifying the target detection object, read the audio file from the audio storage module.

13. The inflatable model according to claim 12, wherein the action assembly further comprises a speaker electrically connected to the MCU module for playing the audio file read from an audio storage module by the MCU module.

14. The inflatable model according to claim 13, wherein the MCU module is electrically connected to the speaker through a power amplifier.

15. The inflatable model according to claim 10, wherein the action assembly comprises an LED lamp panel electrically connected to the MCU module, and the MCU module is configured to, when identifying the target detection object, control the LED lamp panel to work.

16. The inflatable model according to claim 10, wherein the action assembly comprises a motor electrically connected to the MCU module, and the MCU module is conjured to, when identifying the target detection object, control the motor to work.

17. The inflatable model according to claim 10, wherein the MCU module is powered by a power adapter electrically connected to the MCU module, and output of the power adapter is 12V/3 A, 36 W; and the space having a preset dimension is an ellipsoidal area with the microwave antenna as an axis and a radius of less than 10 meters.

18. A method for human detection based on microwaves, comprising: electrically connecting an MCU module to a microwave module, and providing the microwave module with a microwave antenna, wherein the microwave antenna emits microwaves and generates a space microwave alert area having a preset dimension in an axial direction of the microwave antenna;

monitoring, by the microwave module, a power change in the microwave antenna caused by interference between the emitted microwaves and echoes formed after previously-emitted microwaves are reflected by a surface of an object in the space microwave alert area, converting the power change into an electrical signal, and transmitting the electrical signal to the MCU module; and receiving, by the MCU module, the electrical signal, and identifying a target detection object.

19. The method for human detection based on microwaves according to claim 18, wherein a target pulse width is recorded in the MCU module before or when a device for wireless human detection based on microwaves works; and the target detection object is identified as follows: the MCU module filters out the electrical signal less than the target pulse width and identifies the electrical signal greater than the target pulse width.

20. The method for human detection based on microwaves according to claim 19, wherein the MCU module is electrically connected to an action assembly, and when identifying the target detection object, the MCU module controls the action assembly to work.

* * * * *